United States Patent
Mohapatra et al.

(10) Patent No.: US 7,944,502 B2
(45) Date of Patent: May 17, 2011

(54) PIPELINING TECHNIQUES FOR DEINTERLACING VIDEO INFORMATION

(75) Inventors: Satyajit Mohapatra, Tempe, AZ (US); Steven J. Tu, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/715,510

(22) Filed: Mar. 2, 2010

(65) Prior Publication Data

US 2010/0220232 A1  Sep. 2, 2010

Related U.S. Application Data

(63) Continuation of application No. 11/395,607, filed on Mar. 30, 2006.

(51) Int. Cl.
*H04N 7/01* (2006.01)
*H04N 11/20* (2006.01)

(52) U.S. Cl. .................. 348/448; 348/450; 348/451

(58) Field of Classification Search ............. 348/448, 348/441, 450–453, 458, 459; 382/303, 304; H04N 7/01, 11/20

See application file for complete search history.

(56) References Cited

U.S. PATENT DOCUMENTS

| | | |
|---|---|---|
| 6,577,345 B1 | 6/2003 | Lim et al. |
| 6,829,013 B2 | 12/2004 | Thompson et al. |
| 7,006,147 B2 | 2/2006 | Willis |
| 7,064,790 B1 | 6/2006 | Varma et al. |
| 7,375,763 B2 * | 5/2008 | Alfonso et al. ............... 348/448 |
| 2002/0047919 A1 * | 4/2002 | Kondo et al. ............... 348/441 |
| 2007/0229704 A1 | 10/2007 | Mohapatra et al. |

FOREIGN PATENT DOCUMENTS

WO  2007115005 A1  10/2007

OTHER PUBLICATIONS

International Search Report and Written Opinion for corresponding application No. PCT/US2007/064460, Jul. 30, 2007, 9 Pages.
"Advanced video coding for generic audiovisual services" International Telecommunication Union, Mar. 2005, 343 pages.
Richardson, Iain E G, "H.264/MPEG-4 Part 10: Inter Prediction", Apr. 30, 2003, 3 pages.
"POWERVR I2P IP Core Family", Imagination Technologies Limited, Feb. 2010, 2 pages.
"I2P De-Interlacer IP Core Family" Retrieved from the internet (http://www.imgtec.com/powervr-i2p.asp) on Mar. 11, 2010, 2 pages.
"CES 2006—Imagination Technologies reveals technologies behind next wave of consumer products", Imagination Technologies Press Release, Jan. 4, 2006, 2 pages.
Non-Final Office Action Mailed Apr. 16, 2010, U.S. Appl. No. 11/395,607, 6 pages.

* cited by examiner

*Primary Examiner* — Sherrie Hsia
(74) *Attorney, Agent, or Firm* — Kacvinsky Daisak PLLC

(57) ABSTRACT

Pipelining techniques to deinterlace video information are described. An apparatus may comprise deinterlacing logic to convert interlaced video data into deinterlaced video data using multiple processing pipelines. Each pipeline may process the interlaced video data in macroblocks. Each macroblock may comprise a set of working pixels from a current macroblock and supplemental pixels from a previous macroblock. Other embodiments are described and claimed.

20 Claims, 11 Drawing Sheets

PIPELINING TECHNIQUES FOR DEINTERLACING VIDEO INFORMATION

This application is a continuation of, and claims priority to, U.S. application No. 11/395,607 filed Mar. 30, 2006, which is incorporated herein in its entirety.

BACKGROUND

Video information is typically encoded using an interlaced or non-interlaced format. An example of a non-interlaced format is a progressive format. Deinterlacing is a technique to convert video information from an interlaced format to a progressive format for a progressive display. Deinterlacing operations, however, may introduce artifacts, blurring or discontinuities into the rendered image. Such phenomena may be further exacerbated when motion occurs between images or image fields. A motion adaptive or compensated deinterlacing scheme may be used to reduce this discontinuity by reading in multiple frames where each frame comprises two fields. The scheme may then determine the direction of motion and mathematically approximate the discontinuity to create a smoother image. Motion adaptive deinterlacing schemes, however, typically require significant amounts of memory bandwidth and are computationally expensive.

BRIEF DESCRIPTION OF THE DRAWINGS

FIG. 5 illustrates one embodiment of a third pixel matrix.

DETAILED DESCRIPTION

Various embodiments may be generally directed to deinterlacing techniques for use in a media processing system. Some embodiments may include a deinterlacing architecture that provides a novel way of partitioning or separating an image block into sub-blocks, and then uniquely storing the sub-blocks to improve deinterlacing operations. The deinterlacing architecture may further utilize parallel processing pipelines to perform pixel conversion operations and median filtering operations. Such operations may need to process temporal data using different algorithms, such as a U conversion formula, a V conversion formula, a median filtering algorithm, and so forth. The deinterlacing architecture attempts to unify the requirements for the different algorithms to a common scheme to allow pipelining operations. In this manner, the deinterlacing architecture may result in memory area reduction, improved memory bandwidth utilization, and higher throughput.

In one embodiment, for example, deinterlacing logic may convert interlaced video data into deinterlaced video data using multiple processing pipelines. Each pipeline may process the interlaced video data in macroblocks. Each macroblock may comprise a set of working pixels from a current macroblock and supplemental pixels from a previous macroblock. The supplemental pixels may be used for median processing operations. In this manner, the deinterlacing logic may reduce or obviate the need to store entire macroblocks of data to perform median processing operations for edge pixel values. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
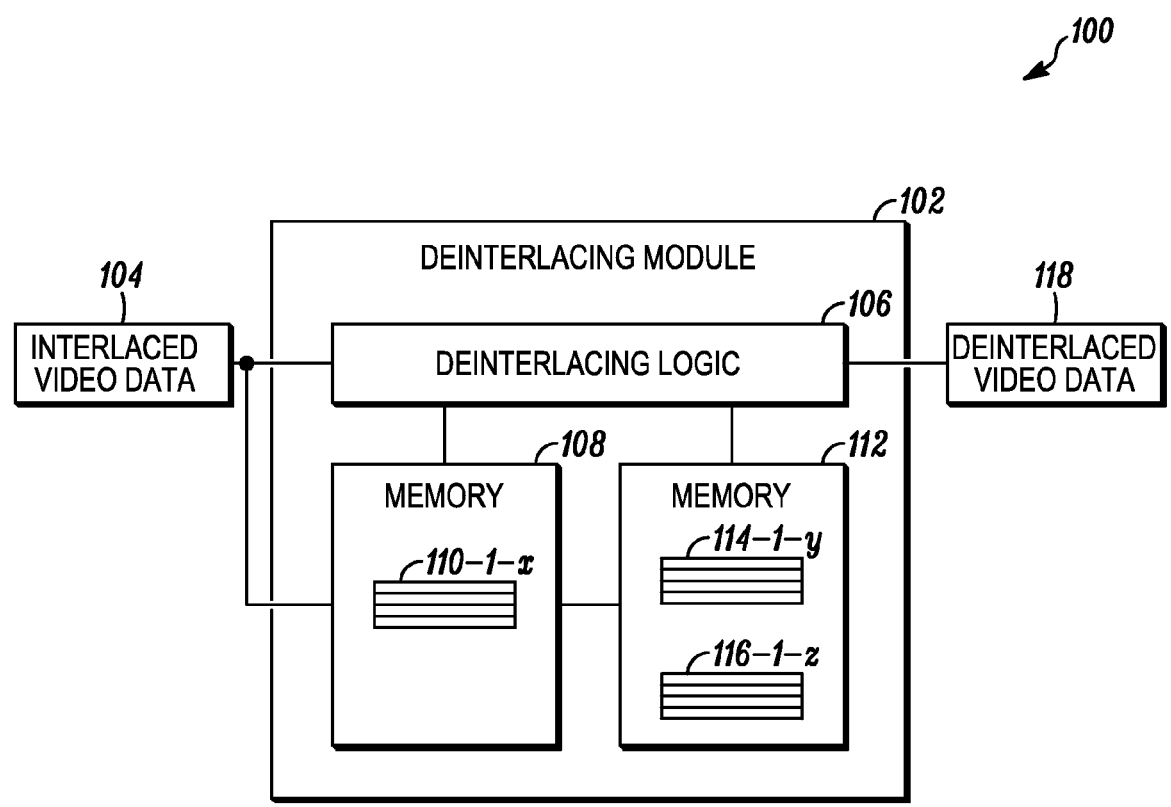
FIG. 1 illustrates one embodiment of a deinterlacing system.

FIG. 1 illustrates one embodiment of a deinterlacing system. FIG. 1 illustrates a block diagram of a deinterlacing system 100. As shown in FIG. 1, deinterlacing system 100 comprises multiple elements, such as a deinterlacing module 102 to receive interlaced video data 104 as input, convert the interlaced video data 104 from an interlaced format to a progressive format, and output deinterlaced video data 118. The embodiments, however, are not limited to the elements shown in FIG. 1.

In general, video data 104, 118 may comprise various images as represented by multiple pixels, pixel values, pixel samples, and so forth. A pixel typically has several associated component values. For example, in the YCbCr color space, a pixel has a Y or "luma" component that specifies the luminance of the pixel. A pixel may also have Cb and Cr "chroma" components that together specify the color of the pixel. The Cb and Cr components may sometimes be referred to as U and V components, respectively. As used herein, the terms may be used interchangeably.

In various embodiments, deinterlacing module 102 may include deinterlacing logic 106. Deinterlacing logic 106 may implement various deinterlacing operations for deinterlacing module 102. Examples of deinterlacing operations may include data fetching operations, color format conversion operations, median filtering operations, interleaving operations, and so forth. Deinterlacing logic 106 may be implemented using logic, circuits, software, or any combination thereof. For example, deinterlacing logic 106 may be implemented using a processor, such as a complex instruction set computer (CISC) microprocessor, a reduced instruction set computing (RISC) microprocessor, a very long instruction word (VLIW) microprocessor, a processor implementing a combination of instruction sets, or other processor device. Deinterlacing logic 106 may also be implemented using a dedicated processor, such as a controller, microcontroller, embedded processor, a digital signal processor (DSP), a network processor, a media processor, networked media processor, and so forth. The embodiments are not limited in this context.

In various embodiments, deinterlacing module 102 may include multiple memory units, such as memory units 108, 112. Memory units 108, 112 may be used to store video data 104, 118. Furthermore, memory units 108, 112 may also be used to store various intermediate blocks of partially processed data in one or more memory buffers while deinterlacing logic 106 performs deinterlacing operations. Memory units 108, 112 may include any machine-readable or computer-readable media capable of storing data, including both volatile and non-volatile memory. For example, memory units 108, 112 may be implemented using various types of memory, including read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

In one embodiment, memory 108, 112 may be implemented using different types of memory. For example, memory 108 may be implemented with DRAM and memory 112 with SRAM. DRAM memory is typically less expensive and slower than SRAM memory. As a result, deinterlacing module 102 attempts to balance use and characteristics of both memory types in order to efficiently perform deinterlacing operations, with the characteristics including the amount of each memory type (e.g., memory area) and the transfer of data between the memory types (e.g., memory bandwidth).

Deinterlacing module 102 may receive interlaced video data 104 to perform format conversion operations. Interlaced signals are generated from a line-by-line scan of an image scene. The signals are generated by scanning and transmitting every other line of the image scene. The even and odd lines in the image scene are referred to as the even and odd fields, respectively. A combination of the even field and the odd field is often referred to as a frame of image data. The frame comprises information needed to represent the entire image scene. An interlaced monitor displays the fields by alternately rendering the information in the even field to the even lines on the monitor and the information in the odd field to the odd lines on the monitor. The overall effect, as perceived by a viewer, is the complete reconstruction of the image scene.

Displaying interlaced video on a progressive monitor, however, may introduce artifacts or blurring into the rendered image. The progressive monitor displays each line of the image scene progressively. Each line of data is displayed in order, starting from the top row of the display and progressing row by row to the bottom. Furthermore, progressively scanned display formats present all lines in the image scene at sixty frames per second. Interlaced video signals, however, only transmit half of the image scene every one sixtieth of a second. Since there is no delay between the presentation of the even and odd rows of image scene information, the number of scan lines of data visible at a given instant in time in progressive mode is twice that which is visible in a corresponding interlaced mode. Thus, there is an information shortfall during format conversion.

The format conversion challenge is to reconstruct an entire image scene at a given instant in time even though only half of the image is available at that time. One technique to accomplish this is to compute pixel values for the missing lines from neighboring pixels in adjacent lines and fields. If there is no motion the two fields in a frame can be merged in a relatively straightforward manner. If there is motion, however, the merged image may have a blur or discontinuity since the object is moving and the snapshot is taken at different times.

A motion adaptive deinterlacing scheme may be used to remove this discontinuity by reading in multiple frames where each frame comprises two fields. The motion adaptive deinterlacing scheme may then determine the direction of motion and mathematically approximate the discontinuity to create a smoother image. This normally involves the conversion of the color (or chroma) part of the image from a first chroma subsampling ratio of YUV 4:2:0 to a second chroma subsampling ratio of 4:2:2 or YUV 4:4:4, followed by applying the appropriate deinterlacing algorithms.

There are a number of design factors to consider when attempting to implement a motion adaptive deinterlacing scheme. Three such design factors include memory bandwidth, memory area, and processing latency. For example, it is possible to have a larger amount of SRAM memory 112 in order to pre-fetch multiple frames to interpolate during deinterlacing operations. This solution requires a relatively high on-chip area for SRAM memory 112, and leads to an uneven distribution of reads to DRAM memory 108. Further, a large amount of temporary memory may be required to store intermediate formats, such as intermediate 4:2:2 images before applying median algorithms for deinterlacing. One advantage to this solution, however, is that bandwidth for DRAM memory 108 remains relatively uncompromised. In another example, it is possible to have a smaller amount of SRAM memory 112. This may cause deinterlacing logic 106 to fetch smaller amounts of data (e.g., pixels) from DRAM memory 108 which are unevenly distributed in DRAM memory 108, process a relatively few amount of pixels, and write the processed pixels back to DRAM memory 108. This may result in wasted bandwidth since potentially reusable pixels are discarded due to the smaller amounts of SRAM memory 112. In addition, the smaller fetches reduce the possibility of pre-fetching pixels, thereby preventing pipelining operations to decrease latency. Such designs typically convert chroma components from a 4:2:0 to 4:2:2 ratio, and stores the 4:2:2 chroma pixels back to DRAM memory 108. After all the chroma pixels are converted, the 4:2:2 chroma pixels are re-fetched to perform median processing for deinterlacing. This creates increased traffic for DRAM memory 108 and also higher processing latency.

Some embodiments attempt to solve these and other problems by creating an area efficient design that reduces an amount of expensive on-chip SRAM memory 112 used to enhance color and deinterlace NV12 4:2:0 format images stored in a macroblock format in DRAM memory 108. This deinterlacing architecture potentially improves bandwidth consumption for DRAM memory 108, reduces area for SRAM memory 112, and reduces processing latency.

In various embodiments, deinterlacing module 102 may receive interlaced video data 104. Deinterlacing module 102 may process interlaced video data 104 in real-time as it is received, or alternatively, store interlaced video data 104 in DRAM memory 108. Deinterlacing module 102 may store images in a macroblock format using a tiled memory controller, thereby ensuring macroblocks 110-1-$x$ are stored in the same DRAM page. This may allow deinterlacing module 102 to fetch a working set of pixels for processing in a single DRAM burst without any DRAM penalty, thus improving memory bandwidth.

In various embodiments, macroblocks 110-1-$x$ may each comprise a p×q matrix of YUV pixels for an image. The values for p×q may be selected for a given level of efficiency as desired for a given implementation. Some embodiments may use, for example, a macroblock format of 16×16, 32×32, or some other such combination of pixels that are stored in the same DRAM page of DRAM memory 108. The embodiments are not limited in this context.

In various embodiments, deinterlacing logic 106 may convert interlaced video data 104 in a more efficient manner using macroblocks 110-1-$x$. Retrieving and processing individual pixels would consume significant amounts of DRAM bandwidth and create significant amounts of latency. By contrast, retrieving and processing entire frames of image data would require a larger amount of SRAM memory 112. Processing interlaced video data 104 using macroblocks 110-1-$x$ allows a balance between DRAM bandwidth consumption and SRAM memory area. Macroblocks 110-1-$x$ also facilitate pre-fetching of edge data useful for performing motion-compensated deinterlacing operations.

To further enhance deinterlacing operations, deinterlacing logic 106 may use a pipelining architecture to increase processing throughput. Deinterlacing logic 106 may use multiple processing engines, with each processing engine processing a portion of macroblocks 110-1-$x$. Parallel processing increases throughput of the relatively computationally intensive algorithms used for chroma enhancement and median filtering operations, for example. Deinterlacing logic 106 may be described in more detail with reference to FIG. 2.

Figure 2:
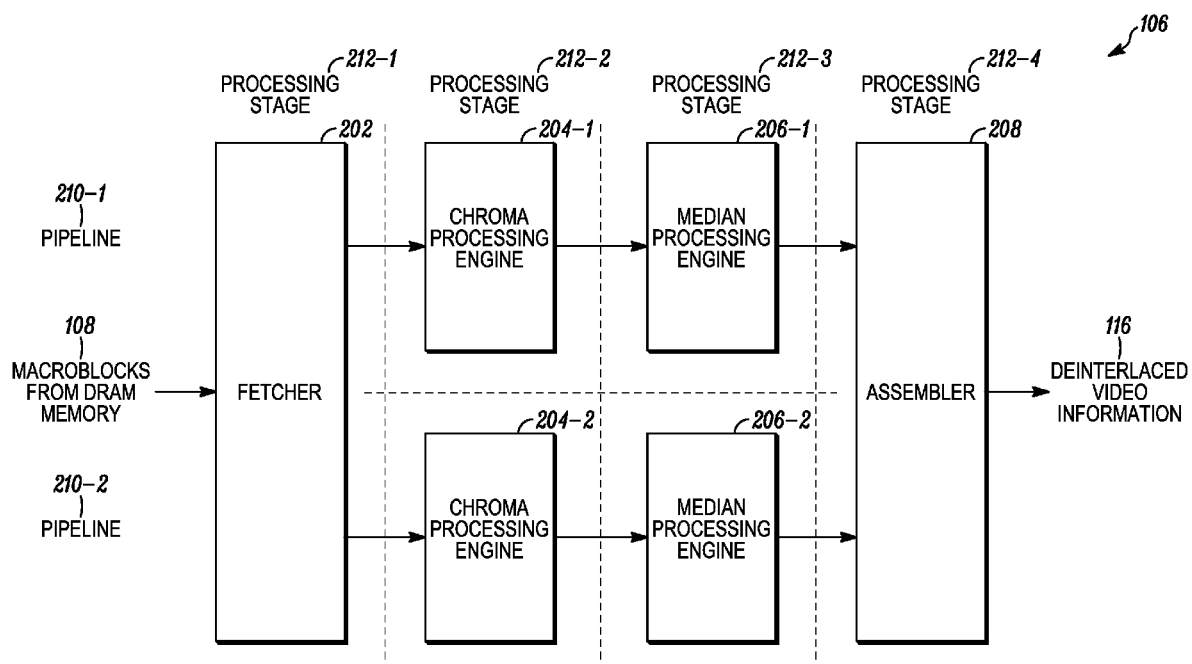
FIG. 2 illustrates one embodiment of a deinterlacing logic.

FIG. 2 illustrates one embodiment of a deinterlacing logic. FIG. 2 illustrates a block diagram of deinterlacing logic 106. Deinterlacing logic 106 may be implemented using an innovative pipelining scheme designed to process macroblocks 110-1-$x$ stored in DRAM memory 108. Deinterlacing logic 106 may be arranged to convert interlaced video data 104 into deinterlaced video data 118 using multiple processing pipelines 210-1, 210-2. Each pipeline 210 may process interlaced video data 104 in macroblocks 110-1-$x$. In some embodiments, each pipeline may create various intermediate macroblocks, such as intermediate macroblocks 114, 116. Each intermediate macroblock 114, 116 may comprise a set of working pixels from a current macroblock being processed by pipelines 210, and supplemental pixels from a previous macroblock processed by pipelines 210. The supplemental pixels may be used to facilitate median processing operations.

As shown in FIG. 2, deinterlacing logic 106 may include various media processing stages 212-1-4. For example, processing stage 212-1 may include a fetcher 202. Processing stage 212-2 may include chroma processing engines 204-1, 204-2. Processing stage 212-3 may include median processing engines 206-1, 206-2. Processing stage 212-4 may include an assembler 208. Deinterlacing logic 106 may also include multiple media processing pipelines 210-1, 210-2. For example, processing pipeline 210-1 may include fetcher 202, chroma processing engine 204-1, median processing engine 206-1, and assembler 208. Processing pipeline 210-2 may include fetcher 202, chroma processing engine 204-2, median processing engine 206-2, and assembler 208. Although FIG. 2 illustrates deinterlacing logic 106 with a limited number of pipelines and processing engines for clarity, it may be appreciated that any number of pipelines and processing engines may be used as desired for a given implementation. The embodiments are not limited in this context.

During processing stage 212-1, fetcher 202 pre-fetches and/or fetches macroblocks 110-1-$x$ from DRAM memory 108. For example, converter 202 may execute multiple hardware threads to fetch macroblocks 110-1-$x$ having three fields n−1, n, and n+1 from two consecutive 4:2:0, NV12 interlaced video frames. Fetcher 202 may also partition, split, distribute or otherwise separate the fetched macroblocks 110-1-$x$ into the luma or Y samples, chroma Cb/U samples, and chroma Cr/V samples. Separating the fetched macroblocks 110-1-$x$ facilitates data input operations for pipelines 210-1, 210-2. Fetcher 202 may store the fetched data in SRAM memory 112 as one or more intermediate macroblocks of varying sizes, such as intermediate macroblocks 114-1-$y$ or 116-1-$z$, for example. Alternatively, fetcher 202 may output the fetched and separated data to chroma processing engines 204-1, 204-2 directly.

During processing stage 212-2, chroma processing engines 204-1, 204-2 may receive the output data from fetcher 202, or alternatively SRAM memory 112. Chroma processing engines 204-1, 204-2 may begin converting YUV pixels from macroblocks 110-1-$x$ from a first chroma format to a second chroma format. For example, chroma processing engines 204-1, 204-2 may convert macroblocks 110-1-$x$ from a 4:2:0 chroma format to one of a 4:2:2 chroma format, a 4:4:4 chroma format, or some other desired chroma format. To accelerate processing speeds and reduce stalling, chroma processing engine 204-1 may be arranged to process Cb/U samples associated with pixels from macroblocks 110-1-$x$, and chroma processing engine 204-2 may be arranged to process Cr/V samples associated with pixels from macroblocks 110-1-$x$. Chroma processing engines 204-1, 204-2 may store all or some of the converted pixels as intermediate macroblocks 114-1-$y$ or 116-1-$z$, or pass the intermediate macroblocks directly to median processing engines 206-1, 206-2 of processing stage 212-3. The luma or Y samples may flow through chroma processing engines 204-1, 204-2 without any processing, thereby effectively bypassing chroma processing engines 204-1, 204-2.

During processing stage 212-3, median processing engines 206-1, 206-2 may receive the output data from chroma processing engines 204-1, 204-2, respectively, or alternatively SRAM memory 112. Median processing engines 206-1, 206-2 performs parallel median filtering operations on the converted chroma samples. For example, median processing engine 206-1 performs median filtering operations on the converted Cb/U samples, while median processing engine 206-2 performs median filtering operations on the converted Cr/V samples. Median processing engines 206-1, 206-2 may also perform median filtering operations for the luma or Y samples that were passed through chroma processing engines 204-1, 204-2, respectively. Median processing engines 206-1, 206-2 may output filtered samples to assembler 208.

During processing stage 212-4, assembler 208 receives the output data from median processing engines 206-1, 206-2, or alternatively SRAM memory 112. Assembler 208 reassembles the split macroblock 110 for luma samples, and reassembles the separated U and V samples to recreate a NV12 chroma block. In one embodiment, for example, assembler 208 may reassemble the separated YUV samples by interleaving the bytes. Assembler 208 may output the NV12 chroma blocks as deinterlaced video information 118 for display by a progressive display.

Because of the difference in the spatial requirements of the pixels for the chroma enhancement (e.g., U algorithm and V algorithm) and median filtering algorithms, deinterlacing logic 106 may need to fetch data from DRAM memory 108, and store data in DRAM memory 108 or SRAM memory 112, in manner that allows the parallel pipelines 210-1, 210-2 to execute in a lockstep manner without stalling. This may be facilitated using the various macroblocks and intermediate macroblocks, as further described in greater detail with reference to FIGS. 3 and 4.

Figure 3A:
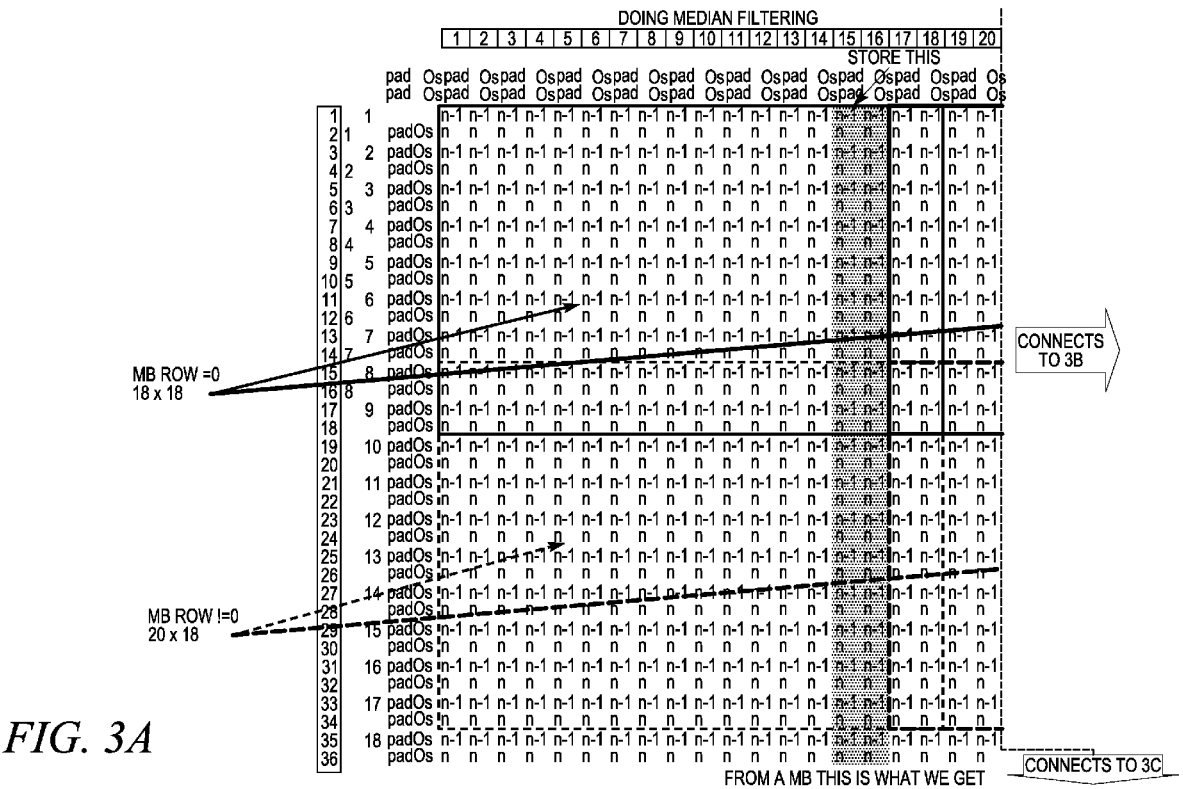
FIG. 3 illustrates one embodiment of a first pixel matrix.
Figure 3B:
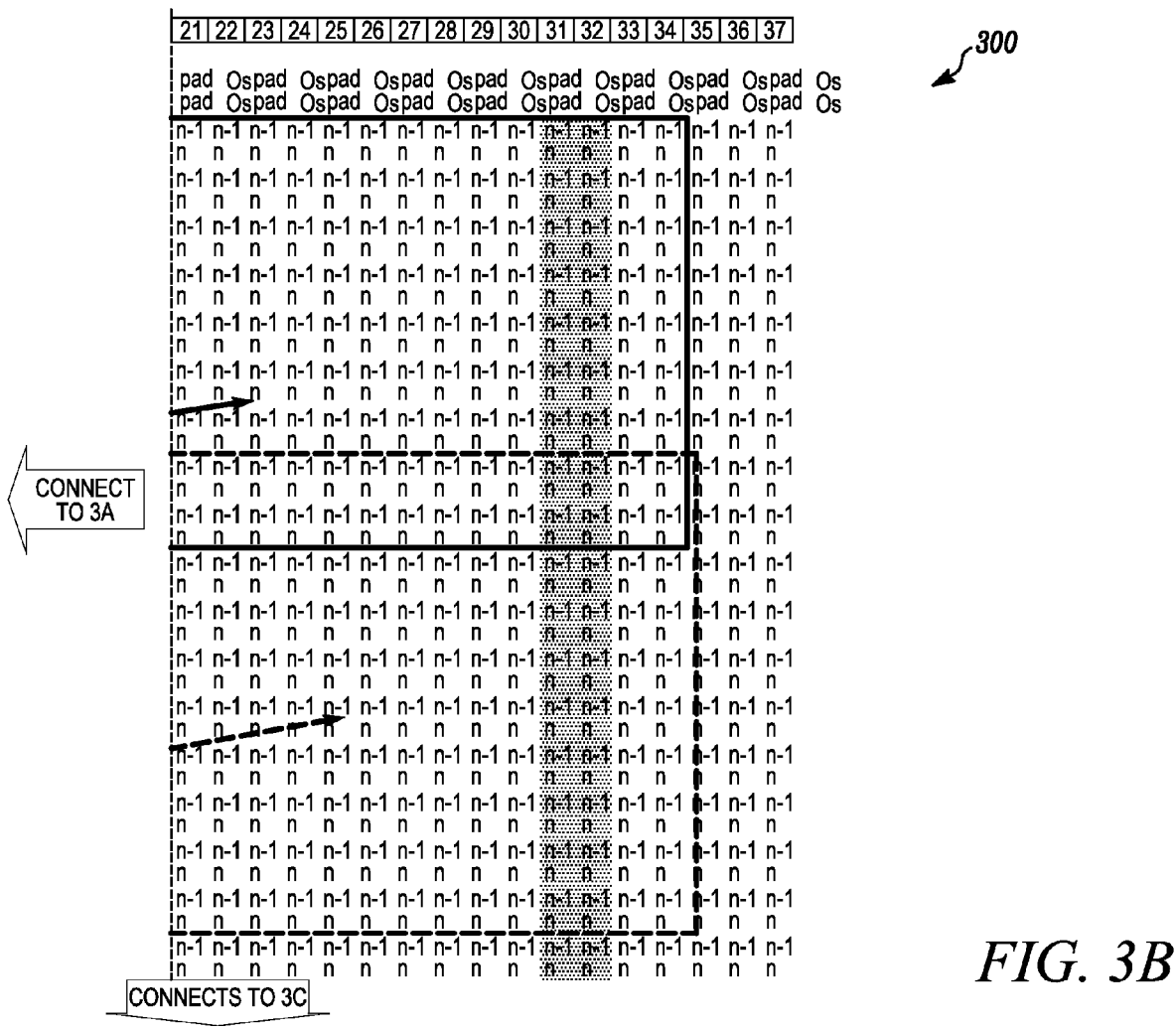
Figure 3C:
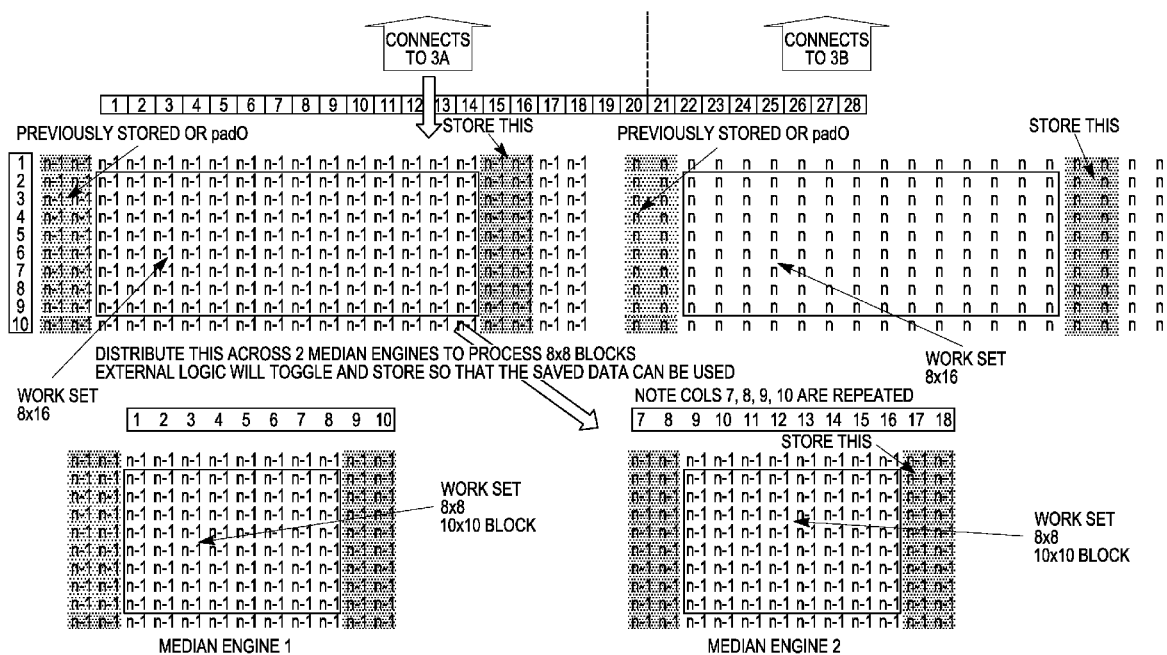

FIG. 3 illustrates one embodiment of a first set of image pixels. FIG. 3 illustrates a pixel matrix 300. Pixel matrix 300 may comprise multiple pixel values for an image. Pixel matrix 300 may illustrate macroblocks 114-1-$y$ as defined for luma deinterlacing and stored in SRAM memory 112. As shown in FIG. 3, pixel matrix 300 comprises scan rows 1-36 and columns 1-37. Scan rows 1-36 may represent even lines as n and odd lines as n−1. Pixel matrix 300 may have pad zero (0) values surrounding the edge pixel values of pixel matrix 300. Pixel matrix 300 may have any number of scan rows, columns, and pad values as desired for a given implementation.

In operation, assume fetcher 202 is arranged to fetch a 16×16 size macroblock 110 from DRAM memory 108. A typical median filtering algorithm implemented for median processing engines 206-1, 206-2 uses surrounding pixel values to remove noise from an image or other signals. When retrieving a 16×16 macroblock, however, there may be complications in performing median filtering operations for the pixels surrounding the edges of the retrieved macroblock 110. For example, median processing engines 206-1, 206-2 may need to wait for pixel values from various macroblocks that surround a current macroblock 110 in order to complete median processing operations for the current macroblock 110. This may lock up or stall pipelines 210-1, 210-2.

To reduce or avoid this latency, an element in a given pipeline 210 that is before median processing engines 206-1, 206-2 may be arranged to generate an intermediate macroblock (e.g., intermediate macroblocks 114 and/or 116) with a size greater than the 16×16 macroblock retrieved by fetcher 202. The intermediate macroblock may include supplemental pixel values from pixels surrounding one or more edges of the retrieved 16×16 macroblock. For example, assume a given deinterlacing algorithm requires k lines above and k lines below a given macroblock 110, and m pixels on the left and n pixels on the right of a given macroblock 110, in order to perform deinterlacing operations. To form pipelines 210-1, 210-2, chroma processing engines 204-1, 204-2 earlier in the pipeline may be arranged to generate intermediate macroblocks 114-1-$y$ having a size of (16+m+n)*(16+2k). The intermediate macroblocks may be generated using pixel values from previously processed macroblocks stored in SRAM memory 112. Storing a portion of previously processed macroblocks may reduce or eliminate the need for extra storage in SRAM memory 112 as pipelines 210-1, 210-2 are formed, since there is no need to pre-fetch or store entire macroblocks.

For luma processing, chroma processing engines 204-1, 204-2 are benign and the luma data flows through chroma processing engines 204-1, 204-2 to median processing engines 206-1, 206-2. As previously described, chroma processing engines 204-1, 204-2 may form one or more intermediate macroblocks 114-1-$y$, 116-1-$z$ each having a size of (16+m+n)*(16+2k) in anticipation of use by later stages of pipelines 210-1, 210-2. For example, assuming a deinterlacing algorithm implemented by median processing engines 206-1, 206-2 has k=2, then 20 vertical lines may be required to process a given 16×16 macroblock 110-1-$x$. Further, assuming the deinterlacing algorithm has the values of m=n=2, then 20 columns may be required to process a given 16×16 macroblock 110-1-$x$. To form the intermediate macroblocks having a 20×20 matrix size, chroma processing engines 204-1, 204-2 may store the right n pixels of a previously processed macroblock 110 in SRAM memory 112, which may be used to process a current macroblock 110. This releases internal buffers formed in SRAM memory 112 to store the next macroblock 110, and allows the pipeline to flow freely while reducing potential stalling conditions.

Since deinterlacing logic 106 uses two median engines to maintain free-flowing pipelines 210-1, 210-2 and also allow pipelines 210-1, 210-2 to operate in lock step manner during NV12 chroma processing operations, the 20×20 intermediate macroblock may be separated into sub-blocks to enable parallel processing of luma samples thereby taking full advantage of the extra resource. For example, an 18×18 intermediate macroblock and/or a 20×18 intermediate macroblock may be formed from pixel matrix 300 depending upon a location within pixel matrix 300. Pixel values for pixels from each intermediate macroblock may be distributed across two sub-blocks, with a first sub-block having a 20×10 matrix of n−1 pixel values (e.g., odd field) and a working set of 8×16 pixel values, and a second sub-block having a 20×10 matrix of n pixel values (e.g., even field) and a working set of 8×16 pixel values. The remaining pixel values for each sub-block may comprise supplemental pixel values and/or pad values. Each sub-block may be further distributed across two median processing blocks, with each median processing block comprising a 10×10 matrix of pixel values having a working set of 8×8 pixel values. The first median processing block may be processed by median processing engine 206-1, while the second median processing block may be processed substantially in parallel by median processing engine 206-2.

In various embodiments, deinterlacing logic 106 may process macroblocks 110 in accordance with a given raster order. Raster order may refer to the sliding direction or how deinterlacing logic 106 steps through the image window to complete processing of the entire picture. In one embodiment, deinterlacing logic 106 may use a horizontal sliding raster order. FIG. 3 illustrates several boxes to convey the "stepping" idea with a macroblock region drawn for a current and next window, thereby indicating a horizontal raster order relationship. Alternatively, deinterlacing logic 106 may use a vertical raster order as well.

Figure 4A:
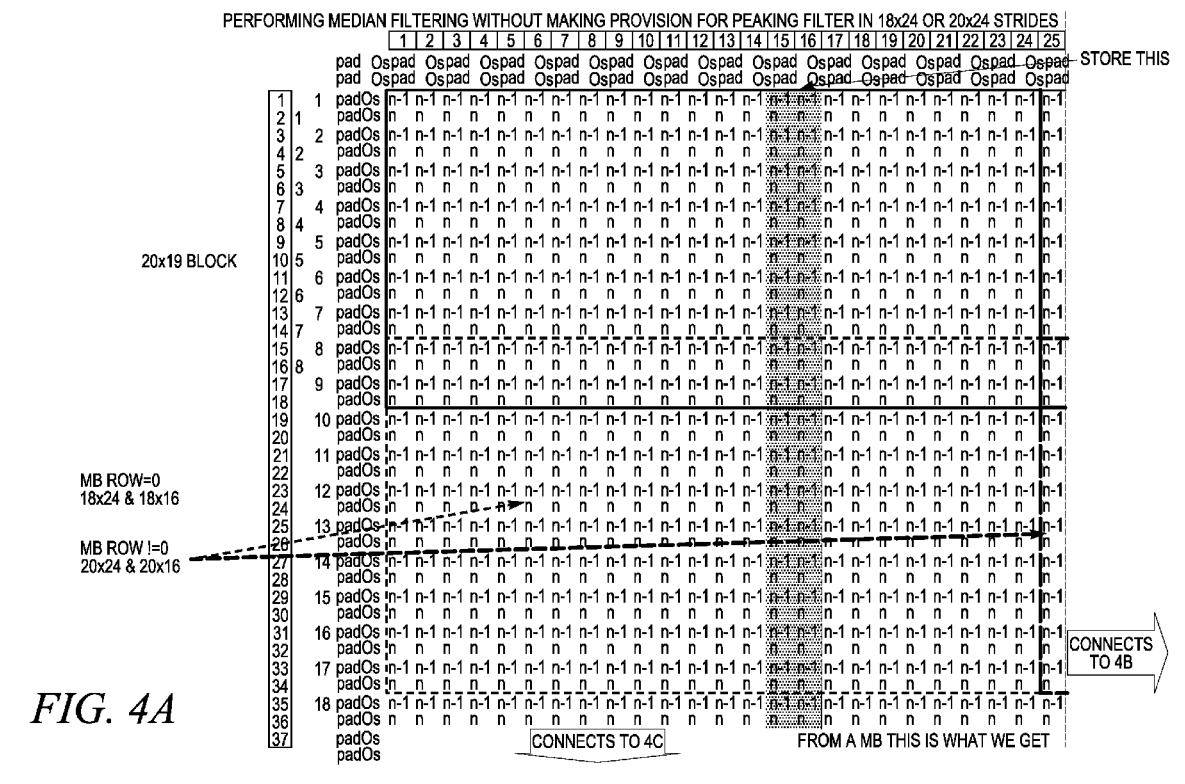
Figure 4B:
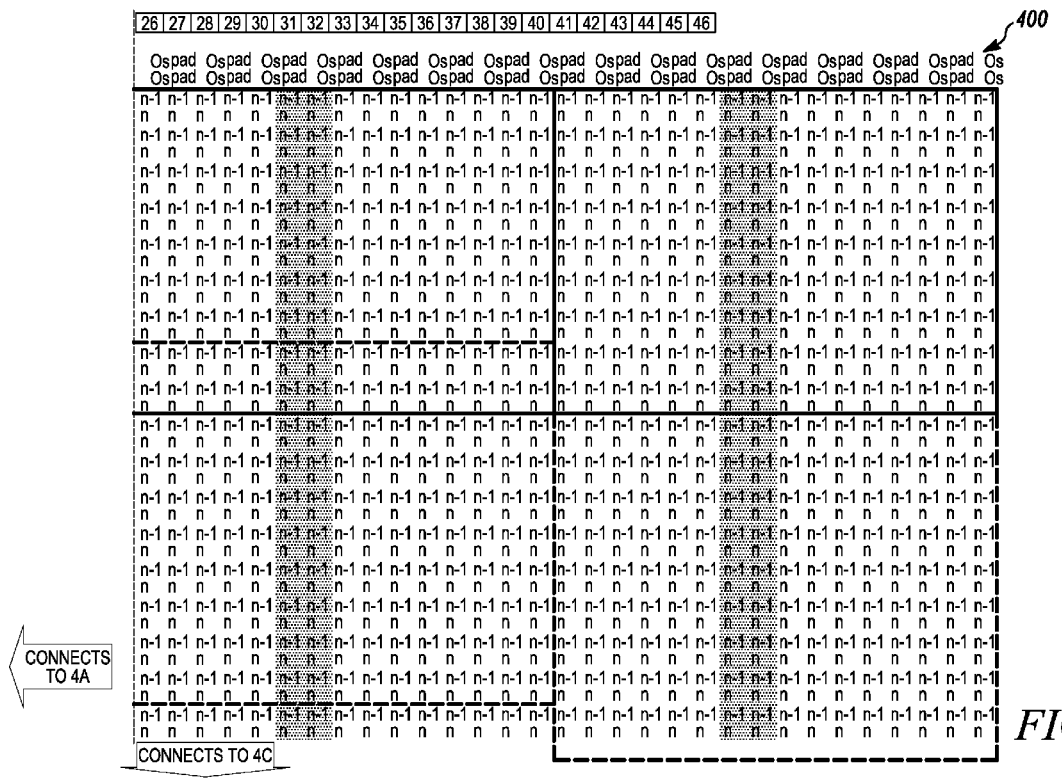
FIG. 4 illustrates one embodiment of a second pixel matrix.
Figure 4C:
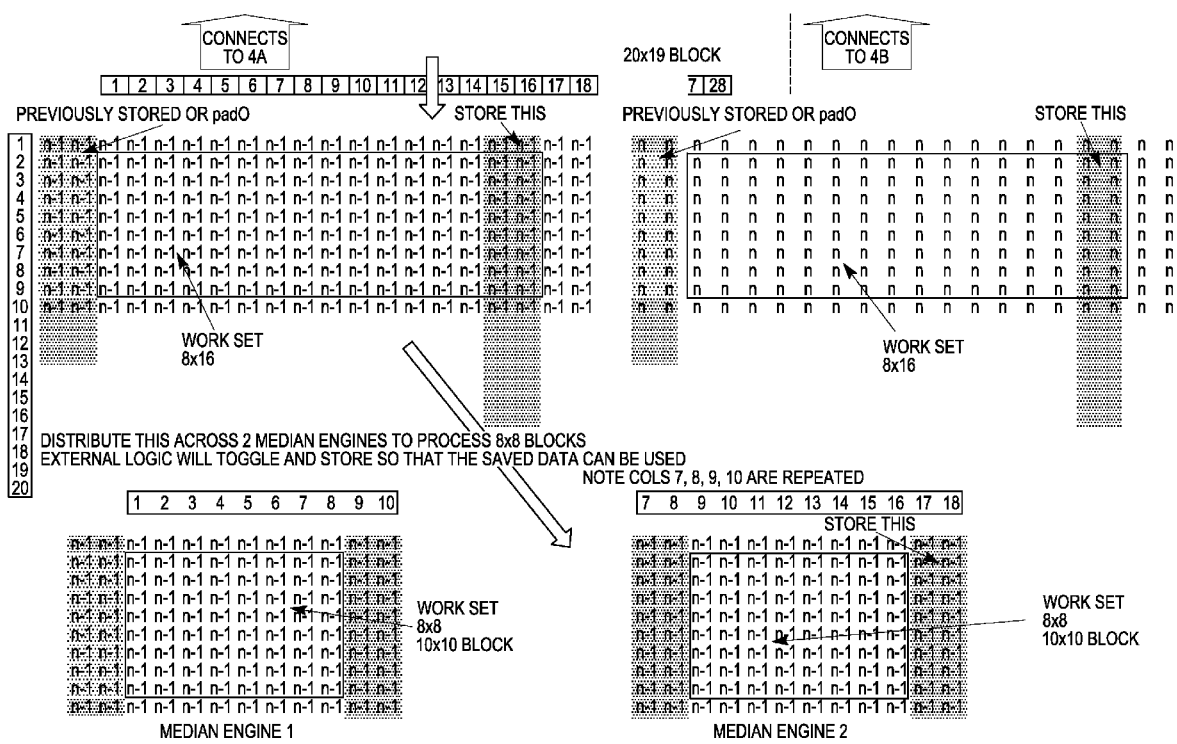

FIG. 4 illustrates one embodiment of a second set of image pixels. FIG. 4 illustrates a pixel matrix 400. Pixel matrix 400 may illustrate macroblocks and a raster order for fetching operations when using a type of DRAM memory 108 that may have burst size limitations. For example, assume DRAM memory 108 has a burst size limitation that only allows for fetches in multiples of 8 bytes (e.g., DDR memory). In this case, to fetch a 20×18 block fetcher 202 may actually need to fetch a 20×24 block and discard the undesired data. In one embodiment, however, fetcher 202 may reuse the discarded data. The discarded bytes may be stored in SRAM memory 112. Once the discarded bytes are stored, fetcher 202 may fetch 16×16 blocks for subsequent raster processing. This may result in a significant memory bandwidth savings. As shown in pixel matrix 400, only the first fetch in a row is a 20×24 fetch.

Figure 5:
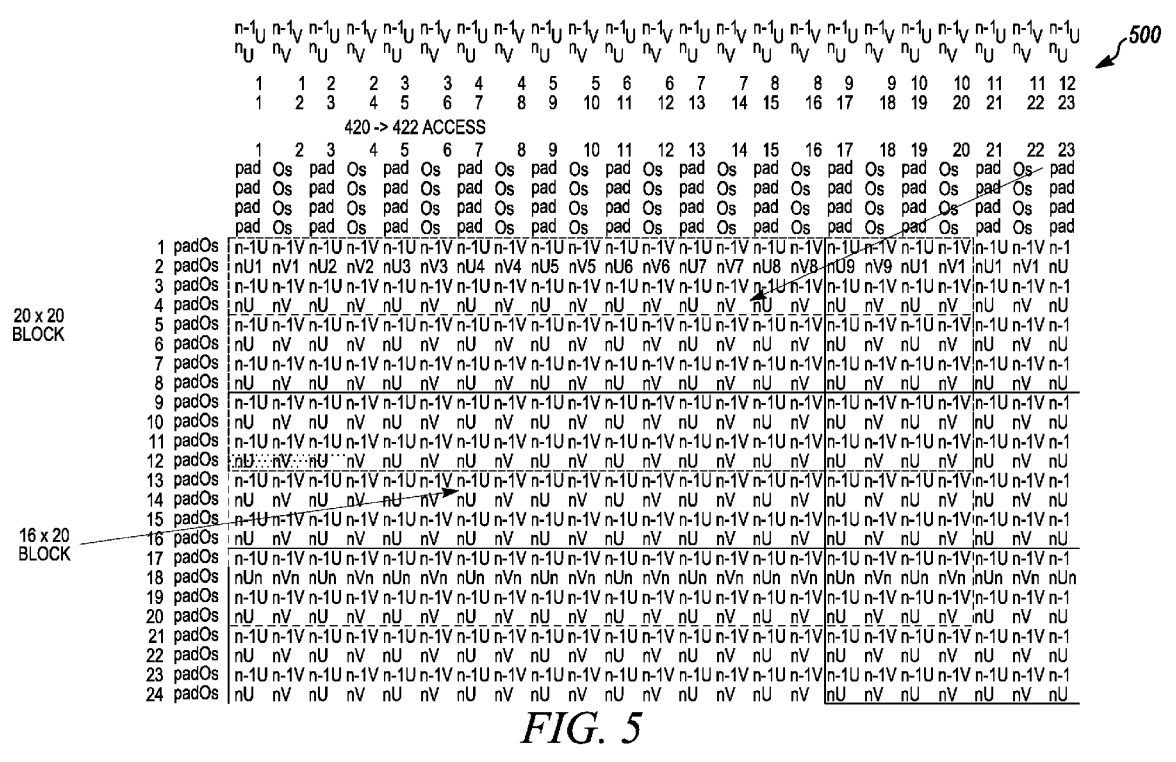

FIG. 5 illustrates one embodiment of a third set of image pixels. FIG. 5 illustrates a pixel matrix 500. Pixel matrix 500 may comprise multiple pixel values for an image. Pixel matrix 500 may illustrate intermediate macroblocks 116-1-$z$ as defined for chroma deinterlacing and stored in SRAM memory 112. As shown in FIG. 5, pixel matrix 500 comprises scan rows 1-24 and columns 1-23. Scan rows 1-24 may represent even lines as nU and nV, and odd lines as n−1U and n−1V. Pixel matrix 500 may have pad zero (0) values surrounding the edge pixel values of pixel matrix 500. Pixel matrix 500 may have any number of scan rows, columns, and pad values as desired for a given implementation.

Pixel matrix 500 may illustrate a fetching technique for chroma samples (e.g., CbCr or UV). Chroma processing engines 204-1, 204-2 may implement a 4:2:0 to 4:2:2 chroma conversion algorithm that generates 4 lines for every 6. In order to get a 20×18 intermediate macroblock for median filtering operations, pipelines 210-1, 210-2 at processing stage 212-2 should take in an input block having a matrix size of 16×20. The working set is 8×20, and 4 extra lines are fetched on top and 4 extra at the bottom. In other words, 2k extra lines of supplemental pixel values may need to be processed. This makes pipelining possible for deinterlacing logic 106. To reduce control logic for deinterlacing logic 106 while still maintaining a lockstep pipeline, a second parallel median processing engine is employed as described with reference to FIG. 2. This facilitates the separation of the U and the V components into the two median processing engines 206-1, 206-2, which can be processed in lock step and then reassembled by assembler 206 by interleaving the bytes. Without a second median processing engine, pipelines 210-1, 210 2 may be susceptible to stalling, thereby adversely affecting latency. Furthermore, this allows 2 fields to be generated in parallel using n−1, n, n+1 and n, n+1 and n+2 fields, since it is memory efficient to fetch all the n, n−1, n+1 and n+2 fields.

Although some embodiments are described using exemplary values, other embodiments may use different macroblocks of varying sizes, different deinterlacing algorithms, and more parallel processing engines. Thus an efficient "sliding window" scheme has been created to make pipelines 210-1, 210-2 flow while reducing wasted pixels and conserving bandwidth with reduced storage needed by SRAM memory 112.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
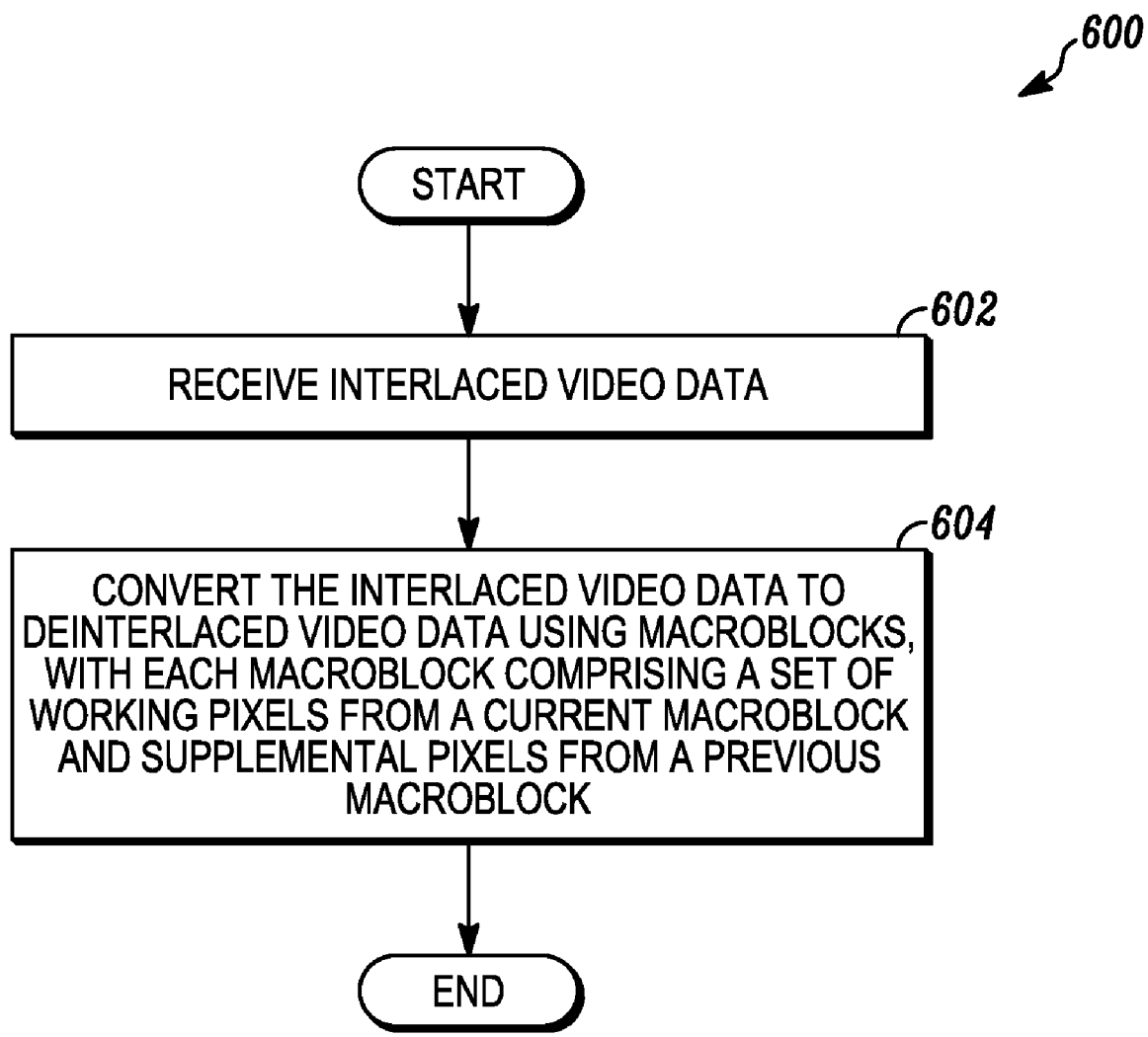
FIG. 6 illustrates one embodiment of a logic flow.

FIG. 6 illustrates one embodiment of a logic flow. FIG. 6 illustrates a logic flow 600. Logic flow 600 may be representative of the operations executed by one or more embodiments described herein. As shown in logic flow 600, interlaced video data may be received at block 602. The interlaced video data may be converted to deinterlaced video data using macroblocks at block 604. Each macroblock may comprise a set of working pixels from a current macroblock and supplemental pixels from a previous macroblock. The embodiments are not limited in this context.

In one embodiment, media filtering operations may be performed using the supplemental pixels. The supplemental pixels may comprise pixels adjacent to or adjoining at least one edge of the current macroblock. In some cases, the supplemental pixels may comprise pixels adjacent to or adjoining all four edges of the current macroblock. The embodiments are not limited in this context.

In one embodiment, chroma samples for the working pixels may be converted from a first chroma format to a second chroma format. Median filtering operations may be performed for luma samples for the working pixels and the converted chroma samples received from the chroma processing engine. The embodiments are not limited in this context.

In one embodiment, macroblocks of interlaced video data may be separated into sub-blocks. Each sub-block may be converted to a predefined chroma format. Each converted sub-block may be filtered using a median filtering algorithm. The filtered sub-blocks may be assembled into deinterlaced video data. The embodiments are not limited in this context.

Figure 7:
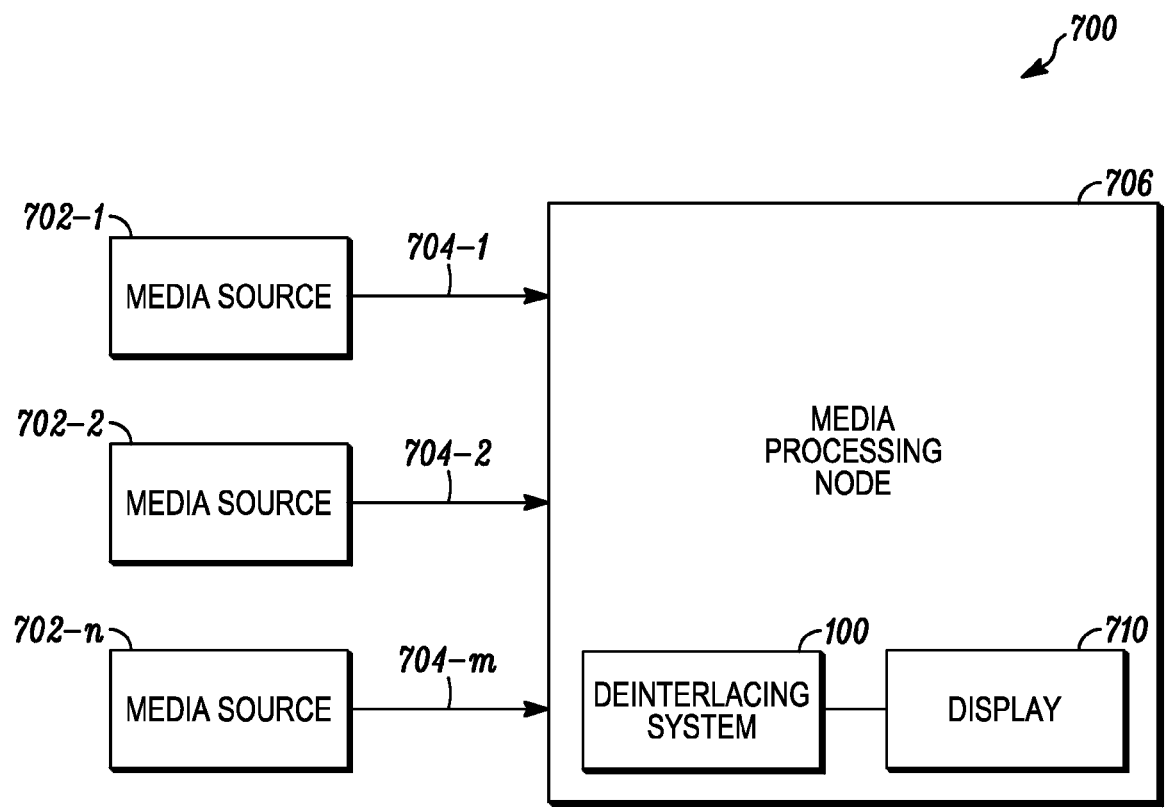
FIG. 7 illustrates one embodiment of a media processing system.

FIG. 7 illustrates one embodiment of a system. FIG. 7 illustrates a system 700. System 700 may be representative of a system or architecture suitable for use with one or more embodiments described herein, such as deinterlacing system 100, for example. In one embodiment, for example, media processing system 700 may include multiple nodes. A node may comprise any physical or logical entity for processing and/or communicating information in media processing system 700 and may be implemented as hardware, software, or any combination thereof, as desired for a given set of design parameters or performance constraints. Although FIG. 7 is shown with a limited number of nodes in a certain topology, it may be appreciated that media processing system 700 may include more or less nodes in any type of topology as desired for a given implementation. The embodiments are not limited in this context.

In various embodiments, a node may comprise, or be implemented as, a computer system, a computer sub-system, a computer, an appliance, a workstation, a terminal, a server, a personal computer (PC), a laptop, an ultra-laptop, a hand-held computer, a personal digital assistant (PDA), a television, a digital television, a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, media processing system 700 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television Systems Committee (NTSC) standard, the Advanced Television Systems Committee (ATSC) standard, the Phase Alteration by Line (PAL) standard, the MPEG-1 standard, the MPEG-2 standard, the MPEG-4 standard, the Digital Video Broadcasting Terrestrial (DVB-T) broadcasting standard, the DVB Satellite (DVB-S) broadcasting standard, the DVB Cable (DVB-C) broadcasting standard, the Open Cable standard, the Society of Motion Picture and Television Engineers (SMPTE) Video-Codec (VC-1) standard, the ITU/IEC H.263 standard, Video Coding for Low Bitrate Communication, ITU-T Recommendation H.263v3, published November 2000 and/or the ITU/IEC H.264 standard, Video Coding for Very Low Bit Rate Communication, ITU-T Recommendation H.264, published May 2003, and so forth. The embodiments are not limited in this context.

In various embodiments, the nodes of media processing system 700 may be arranged to communicate, manage or process different types of information, such as media information and control information. Examples of media information may generally include any data or signals representing content meant for a user, such as media content, voice information, video information, audio information, image information, textual information, numerical information, alphanumeric symbols, graphics, and so forth. Control information may refer to any data or signals representing commands, instructions or control words meant for an automated system. For example, control information may be used to route media information through a system, to establish a connection between devices, instruct a node to process the media information in a predetermined manner, monitor or communicate status, perform synchronization, and so forth. The embodiments are not limited in this context.

In various embodiments, media processing system 700 may be implemented as a wired communication system, a wireless communication system, or a combination of both. Although media processing system 700 may be illustrated using a particular communications media by way of example, it may be appreciated that the principles and techniques discussed herein may be implemented using any type of communication media and accompanying technology. The embodiments are not limited in this context.

When implemented as a wired system, for example, media processing system 700 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, media processing system 700 may include one or more wireless nodes arranged to communicate information over one or more types of wireless communication media. An example of wireless communication media may include portions of a wireless spectrum, such as the RF spectrum. The wireless nodes may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

In various embodiments, media processing system 700 may include one or more media source nodes 702-1-d. Media source nodes 702-1-d may comprise any media source capable of sourcing or delivering media information and/or control information to media processing node 706. More particularly, media source nodes 702-1-d may comprise any media source capable of sourcing or delivering digital audio and/or video (AV) signals to media processing node 706. Examples of media source nodes 702-1-d may include any hardware or software element capable of storing and/or delivering media information, such as a DVD device, a VHS device, a digital VHS device, a personal video recorder, a computer, a gaming console, a Compact Disc (CD) player, computer-readable or machine-readable memory, a digital camera, camcorder, video surveillance system, teleconferencing system, telephone system, medical and measuring instruments, scanner system, copier system, television system, digital television system, set top boxes, personal video records, server systems, computer systems, personal computer systems, digital audio devices (e.g., MP3 players), and so forth. Other examples of media source nodes 702-1-d may include media distribution systems to provide broadcast or streaming analog or digital AV signals to media processing node 706. Examples of media distribution systems may include, for example, Over The Air (OTA) broadcast systems, terrestrial cable systems (CATV), satellite broadcast systems, and so forth. It is worthy to note that media source nodes 702-1-d may be internal or external to media processing node 706, depending upon a given implementation. The embodiments are not limited in this context.

In various embodiments, media processing system 700 may comprise a media processing node 706 to connect to media source nodes 702-1-d over one or more communications media 704-1-m. Media processing node 706 may comprise any node as previously described that is arranged to process media information received from media source nodes 702-1-d. In various embodiments, media processing node 706 may comprise, or be implemented as, one or more media processing devices having a processing system, a processing sub-system, a processor, a computer, a device, an encoder, a decoder, a coder/decoder (codec), a filtering device (e.g., graphic scaling device, deblocking filtering device), a transformation device, an entertainment system, a display, or any other processing architecture. The embodiments are not limited in this context.

In various embodiments, media processing node 706 may include deinterlacing system 100 as previously described. Deinterlacing system 100 may comprise a processor, memory, and application hardware and/or software arranged to process media information received from media source nodes 702-1-d. Deinterlacing system 100 may output the processed media information to a display 710. The embodiments are not limited in this context.

In various embodiments, media processing node 706 may include a display 710. Display 710 may be any display capable of displaying media information received from media source nodes 702-1-d. Display 710 may display the media information at a given format resolution. In various embodiments, for example, the incoming video signals received from media source nodes 702-1-d may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1000 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 720 vertical pixels and 1280 horizontal pixels (720× 1280). In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context. The type of displays and format resolutions may vary in accordance with a given set of design or performance constraints, and the embodiments are not limited in this context.

Various embodiments provide several advantages over conventional techniques. For example, the pipelining scheme is highly memory efficient. The bandwidth requirement is reduced by approximately half when processing the chroma part of the image. Without pipelines, deinterlacing logic 106 may need to store the intermediate 4:2:2 or 4:4:4 image back to DRAM memory 108 or SRAM memory 112, and read it back so that the image can be passed through the median filters for deinterlacing. This causes extra writes and reads on DRAM memory 108 on the order of 4 times more than when deinterlacing logic 106 uses pipelining techniques. In multimedia systems in particular, bandwidth utilization for DRAM memory 108 and area of SRAM memory 112 are important design considerations, and the pipelining scheme addresses both considerations. In another example, if internal SRAM memory 112 were to be used then the area of SRAM memory 112 varies based on the size of the image. The pipelining scheme is independent of the size of the image, and in some implementations, only 2k of SRAM memory 112 has been used as compared to other systems requiring 2-4 orders of magnitude of extra SRAM memory 112. In yet another example, utilizing a pipeline and processing the different algorithms in a pipelined fashion reduces or eliminates latency associated with storing and re-fetching of intermediate images. In a system where DRAM memory 108 is loaded, the use of the pipelining scheme causes a dramatic reduction in latency. In still another example, the memory storage scheme and the size of the pre-fetched blocks is highly scalable and allows for the appropriate trade-offs to be made between the bandwidth of DRAM memory 108 and area for SRAM memory 112.

It is worthy to note that the pipelining architecture shown in FIG. 2 may use alternative elements and use the same fetching operations to improve deinterlacing operations. In some embodiments, for example, each pipeline 210 uses a chroma processing engine 204 followed by a median processing engine 206. Alternatively, the concept of fetching supplemental pixel values can be extended when there are other filter blocks at the output of median processing engine 206 (e.g., peaking filters, scalers, mosquito noise reduction, and so forth) or prior to chroma processing (e.g., deblocking filters and so forth). The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The invention claimed is:
1. An apparatus comprising:
a processor;
a first memory;
a second memory;
a deinterlacing module operative on the processor to convert interlaced video data into deinterlaced video, comprising:
a fetcher to fetch a macroblock of video data from the second memory and separate the fetched macroblock into sub-blocks; and
a plurality of processing pipelines, each processing pipline receiving a sub-block, and comprising a chroma processing engine to generate an intermediate macroblock larger than the received sub-block by adding pixel values from previously processed macroblocks stored in the first memory to the sub-block;
wherein the deinterlacing module uses the added pixel values to perform median filtering operations on the sub-blocks.

2. The apparatus of claim 1, the chroma processing engine further to:
   convert chroma samples for the pixels in the sub-block from a first chroma format to a second chroma format; and
   store a portion of a processed sub-block in the first memory.

3. The apparatus of claim 2, each pipeline further comprising:
   a median processing engine to perform median filtering for luma samples for the pixels in the sub-block, and the converted chroma samples received from the chroma processing engine.

4. The apparatus of claim 3, the deinterlacing module further comprising:
   an assembler coupled to said median processing engines, said assembler to assemble the median filtered samples and the converted chroma samples into deinterlaced video data.

5. The apparatus of claim 1, wherein the plurality of pipelines operate substantially in parallel.

6. The apparatus of claim 1, wherein the second memory has burst size limitations that require fetches to be in multiples of N bytes; and wherein the macroblock size is (j×k) bytes, where k is an integer that is not a multiple of N bytes;
   the fetcher to fetch a first block (j×m) bytes, where m>k and m is a multiple of N, generate a macroblock by discarding the bytes of (j×k+1) to (j×m), and store the discarded bytes in the first memory;
   wherein j, k, N, and m are integers.

7. The apparatus of claim 6, wherein the fetcher fetches subsequent blocks that are (g×g) bytes, where g<k, and g is an integer that is a multiple of N.

8. The apparatus of claim 1, wherein the deinterlacing module processes macroblocks in accordance with a raster order.

9. The apparatus of claim 1, wherein the added pixels from previously processed macroblocks comprise pixels adjacent to at least one edge of the sub-block.

10. A method, comprising:
    receiving a macroblock of interlaced video data from a second memory;
    separating the received macroblock into sub-blocks;
    receiving a sub-block in a processing pipeline;
    generating an intermediate macroblock larger than the received sub-block by adding pixel values from previously processed macroblocks stored in a first memory to the sub-block; and
    using the added pixel values to perform median filtering operations on the sub-blocks to generate deinterlaced video data.

11. The method of claim 10, further comprising:
    converting chroma samples for the pixels in the sub-block from a first chroma format to a second chroma format; and
    storing a portion of a processed sub-block in the first memory.

12. The method of claim 11, further comprising:
    performing median filtering for luma samples for the pixels in the sub-block, and the converted chroma samples received from the chroma processing engine.

13. The method of claim 12, further comprising:
    assembling the median filtered samples and the converted chroma samples into deinterlaced video data.

14. The method of claim 10, comprising:
    receiving each sub-block in a separate processing pipeline, and
    operating the pipelines substantially in parallel.

15. The method of claim 10, wherein the second memory has burst size limitations that require fetches to be in multiples of N bytes; and wherein the macroblock size is (j×k) bytes, where k is an integer that is not a multiple of N bytes; the method further comprising:
    fetching a first block (j×m) bytes, where m>k and m is a multiple of N;
    generate a macroblock by discarding the bytes of (j×k+1) to (j×m); and
    storing the discarded bytes in the first memory;
    wherein j, k, N, and m are integers.

16. The apparatus of claim 15, further comprising:
    fetching subsequent blocks that are (g×g) bytes, where g<k, and g is an integer that is a multiple of N.

17. An article comprising a machine-readable storage medium containing instructions that if executed enable a system to:
    separate a macroblock of interlaced video data received from a second memory into sub-blocks;
    generate an intermediate macroblock larger than the received sub-block by adding pixel values from previously processed macroblocks stored in a first memory to the sub-block; and
    use the added pixel values to perform median filtering operations on the sub-blocks to generate deinterlaced video data.

18. The article of claim 17, further comprising instructions that if executed enable the system to:
    convert chroma samples for the pixels in the sub-block from a first chroma format to a second chroma format;
    store a portion of a processed sub-block in the first memory;
    perform median filtering for luma samples for the pixels in the sub-block and the converted chroma samples received from the chroma processing engine; and
    assemble the median filtered samples and the converted chroma samples into deinterlaced video data.

19. The article of claim 17, wherein the second memory has burst size limitations that require fetches to be in multiples of N bytes; and wherein the macroblock size is (j×k) bytes, where k is an integer that is not a multiple of N bytes, the article further comprising instructions that if executed enable the system to: the method further comprising:
    fetch a first block (j×m) bytes, where m>k and m is a multiple of N;
    generate a macroblock by discarding the bytes of (j×k+1) to (j×m); and
    store the discarded bytes in the first memory;
    wherein j, k, N, and m are integers.

20. The article of claim 19, further comprising instructions that if executed enable the system to:
    fetch subsequent blocks that are (g×g) bytes, where g<k, and g is an integer that is a multiple of N.

* * * * *